INVENTORS
Paul Madlener
Otto Peckden
BY
Michael J. Striker
ATTORNEY

3,221,657
MINE IGNITERS
Paul Madlener, Karlsruhe-Durlach, and Otto Pecksen, Berghausen, near Karlsruhe, Germany, assignors to Industrie-Werke Karlsruhe Aktiengesellschaft, Karlsruhe, Germany
Filed May 15, 1963, Ser. No. 281,384
Claims priority, application Germany, May 26, 1962, J 21,836
3 Claims. (Cl. 102—70)

The present invention relates to mines.

In particular, the present invention relates to igniters for mines, and especially to metal-free igniters for land mines.

Metal-free igniters together with metal-free charges or metal-free mines are used in order to prevent the possibility of such mines being traced by electrical sensing devices which are capable of responding to the presence of even a small amount of metal in order to locate such mines.

Metal-free igniters are known, and conventional igniters of this type operate either according to chemical or according to mechanical principles.

When a certain minimum force is applied to a chemical mine igniter, then an element which responds to this force will shatter a plastic or glass container the contents of which automatically produce a flame or explode upon contacting the oxygen in the atmosphere. The structure can be provided with a pair of such containers the contents of which mix upon breaking of the containers so as to provide the explosion. The explosion can provide a flame which directly acts on a detonator, or the released pressure of the explosion can drive a pin which sets off a plastic ignition cap. However, this pin can act upon a snap spring member such as a Belleville spring made out of a plastic reinforced with suitable webbing, and in response to actuation by such a pin the tip of the spring strikes the plastic ignition cap to set it off.

The disadvantage of all chemical igniters is that their operation is limited by temperature considerations. It is conventionally required that igniters, particularly those used by combat engineers, must function properly at temperatures as low as −43° C., and this requirement is not met by chemical igniters. Moreover, there is a considerable lack of safety in the handling of chemical igniters inasmuch as accidental actuation thereof will always result in at least partial ignition.

With mechanical igniters, a pressure member extends from the igniter and acts, in response to application of a force on the pressure member, on a Belleville spring, or the pressure member will act on a shear element such as a shear pin or annular shear member. When the required force acts on the pressure member shearing takes place to set the igniter into operation. The pressure member advances in the igniter to operate either on a Belleville spring or to drive a conical friction member into a cooperating friction element to set the igniter into operation.

A particular type of combat-engineer igniter is a buckling-type of mine igniter. Such an igniter is set into deep snow, high grass, or into the brush of the terrain. The igniter itself is elongated by a pipe which is approximately 1 meter long and which upon buckling sets the igniter into operation. A practical metal-free construction of a buckling-type igniter is not known.

The disadvantage of mechanical igniters of the type referred to above is that the shear pins or the like do not reliably respond to predetermined forces for setting off the igniter. As for the Belleville springs, these are very sensitive to cracking. Because such springs have only a small mass, a plunger is required to be actuated thereby for setting the igniter into operation. Thus, it is essential that the ignition cap be extremely sensitive with such structures.

It is a primary object of the present invention to provide a mine igniter which will avoid all of the above drawbacks. Thus, the mine igniter of the invention will operate at any temperature so that it is not limited in the same way as chemical igniters, and in addition the igniter of the invention can be safely handled since it can be provided with a safety device which will prevent the igniter from operating if it is accidentally handled in such a way that it otherwise would go off. Furthermore, the igniter of the invention will reliably respond to a given force for setting the igniter into operation.

Another object of the present invention is to provide a mine igniter which is of a simple and relatively inexpensive construction requiring no special materials and made up of components which are easily assembled and which will operate reliably.

It is furthermore an object of the present invention to provide a mine igniter which has a safety device which can be easily and quickly moved in a very reliable way between a safety position where it will prevent operation of the igniter and an operating position where the igniter will operate in response to a given force.

It is furthermore an object of the present invention to provide a structure which can be adapted for use in a buckling-type of igniter while at the same time making it possible to make this latter type of igniter completely of non-metallic components.

It is also an object of the present invention to provide a mine igniter with a structure which will respond to forces acting in a plurality of directions for setting the igniter into operation.

It is also an object of the present invention to provide an igniter with a force-creating structure which is very reliable and which is insensitive to almost any type of variable conditions likely to be encountered by the igniter so that the igniter of the invention will operate reliably under almost any conditions.

In general, the basic principle of the invention resides in providing a structure which will create a sudden drop in pressure when a certain force acts on the igniter so that this sudden drop in pressure can be used for actuating a pressure-responsive means which will set the igniter into operation.

Thus, with the above objects in view the invention includes, in a mine igniter, a pressure-responsive means which responds automatically to a pressure differential for setting the igniter into operation. An evacuated, frangible, air-tight container which has an interior at a pressure substantially lower than atmospheric pressure is mounted by a mounting means of the invention in a position where the interior of this container will communicate with the pressure-responsive means upon rupture of the container, so that in this way the rupture of the container will provide the pressure differential to which the pressure-responsive means responds for setting the igniter into operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2:
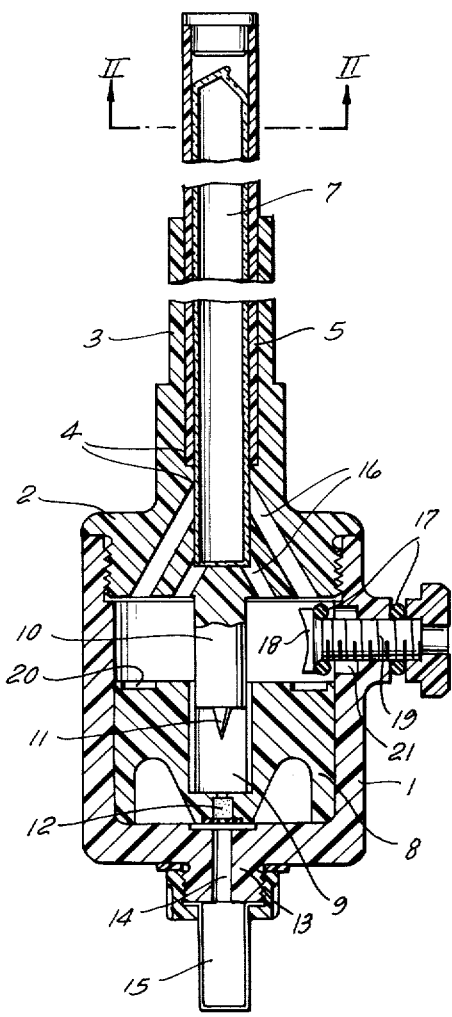
FIG. 1 shows in a longitudinal sectional view a metal-free, buckling-type of igniter constructed according to the present invention and provided with a safety device according to the present invention.
FIG. 2 is a transverse section taken along line II—II of FIG. 1 in the direction of the arrows.

Referring to FIG. 1, it will be seen that the structure includes a housing formed by a cylinder 1, the upper end of which is closed by a mounting means 2 in the form of a closure member threaded into the top end of the cylinder 1, as viewed in FIG. 1, and the mounting means 2 provides an air-tight closure for the cylinder 1. The mounting means 2 is provided with a tubular extension 3 formed with a bore 4 which extends downwardly beyond the extension 3 into the body of the member 2, and the bore 4 is provided with a shoulder on which rests one end of an elongated, plastic tubular member 5 which extends into the extension 3 in the manner shown in FIG. 1, this member 5 being cemented in a fluid-tight manner in the bore 4. The inner surface of the member 5 is provided with longitudinal grooves or flutes 6, as shown in FIG. 2, and it is to be noted that these grooves or flutes 6 extend downwardly beyond the member 5 along the portion of the bore 4 which is beneath the member 5 in FIG. 1. The mounting means 2 is formed with passages 16 communicating with the interior of the cylinder 1 for a purpose described below, and these pasages 16 communicate with the flutes or grooves 6.

Within the plastic tube 5 is situated an evacuated container 7 which in the illustrated example is elongated and substantially rod-shaped, this container 7 being air-tight and being frangible. Thus the hollow interior of the container 7 is at an exteremely low pressure well beneath atmospheric pressure. The material of the container 7 is advantageously brittle, and this container 7 can be made, for example, of glass, plastic, ceramic, or the like. The upper end of the tube 5 is closed in a fluid-tight manner. Thus, it will be seen that the grooves 6 provide the mounting means 2 with a space in which the evacuated container 7 is located, and this space which extends along the entire container 7 communicates through the passages or bores 16 with the interior of the cylinder 1.

The cylinder 1 slidably carries in its interior a freely movable piston 8 which forms a pressure-responsive means capable of responding automatically to a pressure differential in a manner described below. The piston 8 is formed with a central bore 9 into which an extension 10 of the mounting means 2 extends. This extension 10 forms a support member which has at its bottom face, as viewed in FIG. 1, a portion directed toward that portion of the piston 8 which is located at the bottom of the bore 9, and thus when the piston 8 moves upwardly in the cylinder 1 the portion at the bottom of member 10 and the portion at the interior of the bore 9 will approach each other. These portions respectively carry a striking pin and an ignition cap which when brought into engagement with each other will set the igniter into operation. In the particular example illustrated the igniting pin 11 is in the form of a pointed ceramic member fixedly carried by the bottom free end of the support member 10, while the piston 8 carries the ignition cap 12 at the bottom of the bore 9 so that when the piston 8 moves upwardly the ignition cap 12 will be moved into engagement with the striker pin 11 to be set off by the latter. The flame which results from striking of the ignition cap 12 against the pointed ceramic pin 11 spreads through the ignition passage 14 formed in the bottom wall 13 of the cylinder 1 to the detonator 15 located at the exterior of the cylinder 1.

When the tube 5 together with the container 7 are bent or buckled, then the container 7 ruptures so that the interior thereof communicates through the space 6 and the bores 16 with the interior of the cylinder 1 at the upper side of the piston 8, as viewed in FIG. 1, with the result that the pressure in the cylinder at this side of the piston 8 suddenly drops and thus the greater pressure at the lower part of the cylinder drives the piston 8 forcefully toward the mounting means 2 so that the ignition cap 12 is driven into engagement with the striking pin 11 and becomes ignited. The mine then explodes through the detonator 15.

In order to render the igniter safe so that it will not be set into operation during handling, the wall of the cylinder 1 is provided with a threaded bore through which extends a threaded bolt 19 provided outside and inside the cylinder with a pair of sealing rings 17, and at its inner end the bolt 19 fixedly carries a collar 18. The safety device is shown in FIG. 1 in its safety position where it will prevent operation of the igniter. The upper face of the piston 8 is formed with a groove 20, this groove being annular so that irrespective of the angular position of the piston 8 a part of the groove 20 will be directed toward the collar 18 when the safety device is in the position shown in FIG. 1, and if the container 7 should be ruptured accidentally during handling the piston 8 will be able to move toward the mounting means 2 only by the distance required for the collar 18 to engage the piston, this collar 18 being received in the groove 20, so that it is not possible for the piston 8 to advance through a distance sufficient to place the cap 12 in engagement with the striker 11.

In order to place the igniter in a condition ready for operation, the operator need only screw the bolt 19 outwardly of the cylinder so that the collar 18 is received in a recess 21 where the collar 18 is out of the path of movement of the piston 8, and this piston is now free to move in response to rupture of the evacuated container 7.

The vacuum principle of the present invention can of course be extended to other types of igniters.

Figure 3:
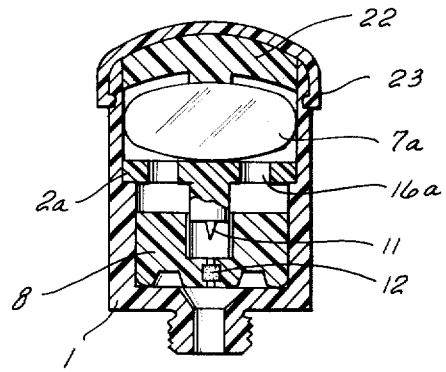
FIG. 3 shows, in a longitudinal sectional illustration, another possibility for the construction of an igniter according to the present invention.

FIG. 3 shows an igniter having basically the same construction as that of FIG. 1. In the embodiment of FIG. 3 the mounting means 2a again closes the cylinder and is formed simply with openings 16a which form a passage for providing communication between the space in which the mounting means 2a positions the frangible, evacuated container 7a, this latter container being situated in a space formed by an extension of the cylinder 1 above the mounting means 2a. This mounting means 2a again has a support portion carrying the striking pin 11 and the piston 8 is constructed as in FIG. 1 and carries the ignition cap 12. The substantially ball-shaped container 7a of FIG. 3 can have either a circular or oval configuration, and within the extension of the cylinder 1 above the frangible container 7a is located a cover 22 capable of shifting axially with respect to the cylinder 1, this cover being in turn covered by a plastic cap 23 which is joined in a fluid-tight manner to the exterior of the extension of the cylinder 1.

With this embodiment, application of a force to the member 22 which tends to press the latter against the container 7a will rupture this container when this force has the required magnitude, and thus the member 22 forms a rupturing means for rupturing the container 7a. Upon rupture of the container 7a the pressure in the interior of the latter and the pressure in the cylinder 1 above the piston 8 will become equalized through the openings 16a of the mounting means 2a, with the result that the piston 8 will be driven upwardly to set the device into operation as described above.

Figure 4:
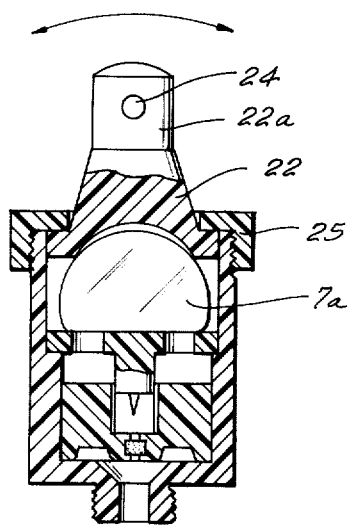
FIG. 4 shows, in a longitudinal sectional view, a further embodiment capable of responding to forces which act in different directions.

The embodiment of FIG. 4 is identical with that of FIG. 3 except that the container 7a has a slightly different configuration and also the member 22 is provided with an extension 22a formed with a bore 24 to which can be connected a suitable non-metallic wire forming a trip wire. An annular cap 25 is threaded onto the upper extension of the cylinder to close the latter in an air-tight manner. With this construction the rupturing means 22 will respond either to a pressure pushing the member 22 axially against the container 7a to rupture the latter or the trip wire can be acted upon to tilt the member 22 in one direction or the other also resulting in rupture of the frangible, evacuated container 7a, and in either case the device will be set into operation as described above.

The embodiments of FIGS. 3 and 4 are provided with safety devices identical with that of FIG. 1.

It is possible to interchange the poistions of the ceramic striking pin 11 and the ignition cap 12 so that the cap 12 is carried by the support member 10 at the bottom portion thereof while the striking pin 11 is carried by the piston 8 in the portion of the bore 9 thereof which is directed toward the bottom of the support member 10 with the point of the pin 11 of course directed upwardly toward the cap to engage the latter when the piston 8 is driven upwardly in response to rupture of the evacuated container 7 or 7a. With such a construction, however, the piston is formed with openings adjacent the pin 11 in the lower part of the piston through which the flame from the cap 12 can pass to reach the passage 14 and extend therethrough to the detonator 15.

All of the above-described components of the igniter of the invention can be made of non-metallic materials so that it is not possible for any electrical sensing devices to detect the location of the igniter. Of course, it is possible to apply the vacuum principle of the present invention to igniters which are not entirely metal-free, but with such igniters the advantage of not being able to trace the location of the igniter is no longer present.

Of course, any of the embodiments of igniters of the invention are mounted in such a way that the pressure of the tire of a vehicle, for example, or the step of an individual will bend or buckle the evacuated container of FIG. 1 or will displace the member 22 of FIGS. 3 and 4 so as to rupture the evacuated container 7a.

It will be understood that each of the elements described above, or two or more together, may also find a useful application in other types of igniters differing from the types described above.

While the invention has been illustrated and described as embodied in mine igniters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A mine igniter consisting of non-metallic elements and comprising, in combination, a cylinder having an open end and an opposed closed end formed with an axial passage extending therethrough; a detonator carried by said cylinder at the exterior thereof in line with said passage; a piston slidable in said cylinder and carrying an ignition cap, said piston being formed with an axial bore in line with said ignition cap; mounting means fluid-tightly closing the open end of said cylinder and having an elongated tubular extension directed away from the interior of said cylinder, said mounting means being formed with at least one passage providing communication between the interior of the cylinder adjacent said open end thereof and the interior of said tubular extension; an elongated, fluid-tight, deformable, tube-like cover member extending outwardly substantially beyond said tubular extension and fluid tightly connected to the latter; an elongated, fluid-tightly closed, frangible, substantially rod-shaped container located in said tubular extension and communicating with said passage of said mounting means, the interior of said container being evacuated to a pressure substantially below atmospheric pressure and said container extending outwardly within said cover member beyond said tubular extension so as to be accessible for breaking in response to deformation of said cover member when an external force is applied to the latter, said container when breaking providing at the side of said piston which is directed toward said open end of said cylinder a pressure substantially less than at the side of said piston directed toward said closed end of said cylinder so that said piston will be driven toward said mounting means; an extension fixed to said mounting means in the interior of said cylinder in alignment with said axial bore of said piston and of a smaller diameter than said bore to be received therein when said piston advances toward said mounting means; and a pin carried by said extension of said mounting means in alignment with said ignition cap to engage the latter when said piston advances toward said mounting means upon breaking of said evacuated container so that a flame resulting from engagement of said pin and ignition cap will spread through said axial passage of said closed end of said cylinder to said detonator at the exterior of said cylinder.

2. A mine igniter consisting of non-metallic elements and comprising, in combination, a cylinder having an open end and an opposed closed end formed with an axial passage extending therethrough; a detonator carried by said cylinder at the exterior thereof in line with said passage; a piston slidable in said cylinder and carrying an ignition cap, said piston being formed with an axial bore in line with said ignition cap; mounting means fluid-tightly closing the open end of said cylinder and having an elongated tubular extension directed away from the interior of said cylinder, said mounting means being formed with at least one passage providing communication between the interior of the cylinder adjacent said open end thereof and the interior of said tubular extension; an elongated, fluid-tight, deformable, tube-like cover member extending outwardly substantially beyond said tubular extension and fluid-tightly connected to the latter; an elongated, fluid-tightly closed, frangible, substantially rod-shaped container located in said tubular extension and communicating with said passage of said mounting means, the interior of said container being evacuated to a pressure substantially below atmospheric pressure and said container extending outwardly within said cover member beyond said tubular extension so as to be accessible for breaking in response to deformation of said cover member when an external force is applied to the latter, said container when breaking providing at the side of said piston which is directed toward said open end of said cylinder a pressure substantially less than at the side of said piston directed toward said closed end of said cylinder so that said piston will be driven toward said mounting means; an extension fixed to said mounting means in the interior of said cylinder in alignment with said axial bore of said piston and of a smaller diameter than said bore to be received therein when said piston advances toward said mounting means; and a pin carried by said extension of said mounting means in alignment with said ignition cap to engage the latter when said piston advances toward said mounting means upon breaking of said evacuated container so that a flame resulting from engagement of said pin and ignition cap will spread through said axial passage of said closed end of said cylinder to said detonator at the exterior of said cylinder, said cylinder further comprising a wall portion situated between said piston and mounting means and formed with a substantially radial threaded bore and with a recess surrounding said threaded bore and located at the interior of said cylinder, a bolt threaded through said threaded bore, and a collar carried by said bolt in the interior of said cylinder to prevent movement of said piston toward said mounting means upon breaking of said container by a distance sufficient to bring said cap into engagement with said pin, until after said bolt has been turned to retract said collar into said recess, said recess having a diameter at least as great as said collar.

3. A mine igniter consisting of non-metallic elements and comprising, in combination, a cylinder having an open end and an opposed closed end formed with a axial passage extending therethrough; a detonator carried by said cylinder at the exterior thereof in line with said passage; a piston slidable in said cylinder and carrying an ignition cap, said piston being formed with an axial bore in line with said ignition cap; mountng means fluid-tightly closing the open end of said cylinder and having an elongated tubular extension directed away from the interior of said cylinder, said mounting means being formed with at least one passage providing communication between the interior of the cylinder adjacent said open end thereof and the interior of said tubular extension; an elongated, fluid-tightly closed, frangible, substantially rod-shaped container located in said tubular extension and communicating with said passage of said mounting means, the interior of said container being evacuated to a pressure substantially below atmospheric pressure and said container extending outwardly beyond said tubular extension so as to be accessible for breaking when an external force is applied thereto; an elongated tube extending into said tubular extension along part of the length thereof and extending outwardly beyond said tubular extension and surrounding and covering the part of said container which extends beyond said tubular extension, said elongated tube and the extension which extends inwardly beyond the latter being formed with elongated inner grooves forming spaces between the exterior of said container and the inner surfaces of said elongated tube and tubular extension, and at least one of said grooves of said tubular extension communicating with said passage of said mounting means, said container when breaking providing at the side of said piston which is directed toward said open end of said cylinder a pressure substantially less than at the side of said piston directed toward said closed end of said cylinder so that said piston will be driven toward said mounting means; an extension fixed to said mounting means in the interior of said cylinder in alignment with said axial bore of said piston and of a smaller diameter than said bore to be received therein when said piston advances toward said mounting means; and a pin carried by said extension of said mounting means in alignment with said ignition cap to engage the latter when said piston advances toward said mounting means upon breaking of said evacuated container so that a flame resulting from engagement of said pin and ignition cap will spread through said axial passage of said closed end of said cylinder to said detonator at the exterior of said cylinder.

References Cited by the Examiner

UNITED STATES PATENTS

| 2,377,174 | 5/1945 | Parker | 102—70 |
| 2,693,147 | 11/1954 | Johnson | 102—8 |
| 2,830,538 | 4/1958 | Dodge | 102—8 |
| 2,843,042 | 7/1958 | Lazari | 102—8 X |

FOREIGN PATENTS

| 554,235 | 6/1943 | Great Britain. |
| 717,204 | 10/1954 | Great Britain. |
| 857,487 | 12/1960 | Great Britain. |

SAMUEL FEINBERG, *Primary Examiner.*

BENJAMIN A. BORCHELT, *Examiner.*